Patented Aug. 9, 1938

2,126,460

UNITED STATES PATENT OFFICE 2,126,460

PREPARATION OF CELLULOSE ESTERS CONTAINING DICARBOXYLIC ACID RADICALS

Leo B. Genung, Rochester, N. Y., assignor, by mesne assignments, to Eastman Kodak Company, Jersey City, N. J., a corporation of New Jersey No Drawing. Application December 4, 1935, Serial No. 52,874

9 Claims. (Cl. 260—101)

The present invention relates to the preparation of cellulose esters containing dicarboxylic acid radicals by reacting upon cellulose or a cellulose derivative containing free and esterifiable hydroxyl groups with a dicarboxylic acid anhydride in the presence of an inert solvent for both the anhydride and the ester produced.

Heretofore, in the preparation of dicarboxylic acid esters of cellulose or cellulose derivatives, the presence of a tertiary amine as a catalyst in the esterification bath has been thought to be necessary. When the preparation of a cellulose ester with an esterification mixture containing a dicarboxylic acid anhydride and an acid catalyst is attempted, the cellulose is degraded by the catalyst at the temperature necessary to cause the anhydride to react with the cellulosic material.

In the case where a tertiary amine is employed as the catalyst, the resulting cellulose derivative does not contain free carboxyl groups, as the second carboxyl of the dicarboxylic radical attached to the cellulose is combined with the amine and a treatment with an acid is necessary to substitute hydrogen for the amine radical and obtain the ester itself rather than the amine salt of the ester.

One object of my invention is to provide a process for preparing cellulose esters containing dicarboxylic radicals in which the ester itself rather than an amine salt of the ester is formed. Another object of my invention is to provide a process in which the use of pyridine, which has an offensive odor, is unnecessary. Other objects will appear herein.

I have found that cellulose or a cellulose derivative containing free and esterifiable hydroxyl groups is esterified by a dicarboxylic acid anhydride in the presence of a solvent for both the reactants and the product, without need of a catalyst. I have found that the ester is formed directly in the process without the need of an acid treatment to remove the amine which is chemically combined with the ester in the former process.

The solvent which is employed must dissolve the anhydride, the product formed and preferably also the starting material, (although with cellulose this is impractical) and it must not react with the anhydride or, in other words, must be inert. It is also preferred that the solvent employed have a boiling point above 100° C., so as to permit the use of reaction temperatures above 100° C., although lower boiling solvents may be used if the process is carried out under pressure or under enclosed conditions. Examples of solvents which answer these requires are: 1:4 dioxan, betamethoxyethyl acetate and cyclohexanone.

Cellulose esters such as cellulose acetate or cellulose ethers such as ethyl cellulose having free and esterifiable hydroxyl groups are suitable as the starting material of processes in accordance with the present invention. It is preferred however that when a cellulose derivative is employed as the starting material it be susceptible of dissolution by the solvent employed in the process.

The following examples illustrate my invention:

Example I 25 lbs. of cellulose acetate having an acetyl content of 33% were dissolved in 100 lbs. of 1:4 dioxan and 50 lbs. of phthalic anhydride were then added. The mixture was heated to 100° C. and maintained at that temperature for 8 hours. The mass was then thinned with an equal volume of acetone and the ester was precipitated out by slowly pouring the reaction mixture into an excess of distilled water containing a little acetic acid. It was then washed with distilled water and dried. The ester was found to have a phthalyl content of 18.9%. If the mixture is allowed to stand for four days, the resulting ester has a phthalyl content of 21.7%. If a temperature of 120° is maintained for four days, the resulting product exhibits a phthalyl content of 25.4%.

Example II

Example I was repeated, using a cellulose acetate of 39% acetyl, except that beta-methoxyethyl acetate was employed as the solvent, instead of 1:4 dioxan. Upon maintaining the reaction mixture at 100° C. for one day, the product formed has a phthalyl content of 20.0%. Upon standing four days, the phthalyl content is 22.8%.

The cellulose acetate-phthalates having a phthalyl content of more than about 20% are soluble in dilute alkalies. Those in which the acetyl is at least 25% and which have a phthalyl content of at least 22% are soluble in acetone, methyl alcohol-acetone (1:1), hot methyl alcohol-acetone (4:1) propylene chloride-methyl alcohol (4:1) hot benzene-methyl alcohol (1:1) and (2:1), hot 1:4 dioxan, beta-methoxy and beta-ethoxy-ethyl alcohols, ethylene glycol monoacetate, BB' dichlorodiethyl ether-methyl alcohol (4:1), hot cyclohexanone and hot beta-methoxy ethyl acetate.

Example III 25 lbs. of cellulose acetate having an acetyl content of 33% was dissolved in 100 lbs. of 1:4 dioxan and 50 lbs. of succinic anhydride was added. After three days at 115° C. the reaction mixture was thinned with acetone and was precipitated by slowly pouring into methyl alcohol. The ester was then washed with distilled water and then with several changes of hot distilled water to remove succinic anhydride and acid.

The resulting ester which had a succinyl content of 22.4% is soluble in dilute alkalies, hot 75% ethyl alcohol, acetone, acetone-methyl alcohol (1:1), hot acetone-methyl alcohol (1:4), methyl acetate, dioxan, beta-methoxy ethyl alcohol, hot beta-ethoxyethyl alcohol, ethylene glycol monoacetate, beta-methoxyethyl acetate, methyl ethyl ketone and hot cyclohexanone.

When the treatment was continued for six days, the product had a succinyl content of 24%.

When cyclohexanone is employed instead of 1.4 dioxan and the temperature is maintained at 100° C. the product has a succinyl content of 20.4% at the end of one day, at the end of three days the product formed has a succinyl content of 26.5%.

Example IV 25 lbs. of cellulose acetate having an acetyl content of 33% were dissolved in 100 lbs. of 1.4 dioxan and 50 lbs. of maleic anhydride was added. The whole was maintained at 100° C. and at the end of one day a sample was withdrawn, diluted with acetone and precipitated in methyl alcohol. It was found to have a maleyl content of 12.5% and to be soluble in dilute alkalies.

The remaining mixture was allowed to react for five days more and was then diluted with acetone and precipitated in methyl alcohol. The product had a maleyl content of 20.2% and was soluble in hot 75% ethyl alcohol, acetone-methyl alcohol (1:1), hot benzene-methyl alcohol (1:1), dioxan, beta-methoxy and beta-ethoxy ethyl alcohols, ethylene glycol monoacetate and beta-methoxyethyl acetate.

When a temperature of 115° is maintained a product having a maleyl content of 25% is obtained at the end of six days.

Example V

Cellulose in the form of paper was treated with an excess of 1% phosphoric acid for 24 hours at 100° C. It was washed free from acid and dehydrated by soaking in several portions of dioxan.

25 grams (dry weight) of this pretreated paper wet with dioxan was heated intermittently for a week with 80 grams of phthalic anhydride and 150 grams of dioxan. The total heating amounted to about 60 hours at 100–150° C. The cellulose which remained in solid form, was washed free of the reaction mixture and was extracted with benzene. It was by analysis to contain 10.5% combined phthalyl. The product was insoluble in acetone and acetone-methyl alcohol (1:1).

In the process of my invention the reaction which occurs apparently involves the attachment of one carboxyl of the dicarboxylic acid radical to the cellulose, replacing a hydroxyl group, and the other carboxyl remains free and unesterified. This reaction using phthalic anhydride may be represented as follows:

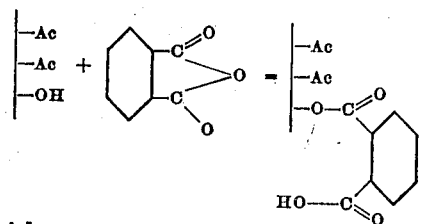

in which

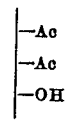

is employed to represent one $C_6$ unit of a partially de-esterified cellulose acetate. It is to be understood that the proportion of two acetyl groups to every hydroxyl is merely given because of ease of illustration and that other cellulose acetates or cellulose derivatives in which the proportion of hydroxyl groups varies from this proportion are suitable for use as the starting material.

The products of the present invention may be converted into salts by treating with a base such as sodium, potassium or ammonium hydroxide, a weakly basic alkali metal salt, the latter having been disclosed and claimed in Malm and Fordyce application Serial No. 690,763, filed Sept. 23, 1933 Patent 2,082,804 or an organic base which includes all the amines. The reaction which takes place is illustrated by the following equation:

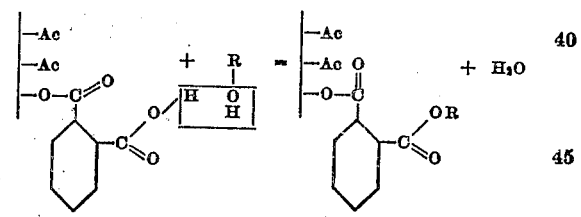

in which R represents an inorganic or organic basic radical. When an amine or ammonia is employed as the base, the two compounds combine to form the salt as is usually the case when these bases react with an acid.

The sodium, potassium and ammonium salts of these cellulose esters are water soluble.

Where the term "inert solvent" is employed herein, it is to be understood as referring to a solvent for the anhydride and for the ester produced in the esterification.

I claim:

1. The process of preparing a cellulose ester containing dicarboxylic acid radicals which comprises reacting at a temperature of at least 100° C. upon a cellulosic material containing free and esterifiable hydroxyl groups, with a dicarboxylic acid anhydride in a bath comprising sufficient inert solvent having a boiling point below 100° C. to dissolve the reagents, the bath being free from esterification catalysts and tertiary organic bases.

2. The process of preparing a cellulose ester containing dicarboxylic acid radicals which comprises reacting at a temperature of at least 100° C. upon a fatty acid ester of cellulose containing free and esterifiable hydroxyl groups, with a dicarboxylic acid anhydride in a bath comprising sufficient inert solvent having a boiling point below 100° C. to dissolve the reagents, the bath being free from esterification catalysts and tertiary organic bases.

3. The process of preparing a cellulose ester containing phthalic acid radicals which comprises reacting at a temperature of at least 100° C. upon a fatty acid ester of cellulose containing free and esterifiable hydroxyl groups, with phthalic anhydride in a bath comprising sufficient inert solvent having a boiling point below 100° C. to dissolve the reagents, the bath being free from esterification catalysts and tertiary organic bases.

4. The process of preparing a cellulose ester containing dicarboxylic acid radicals which comprises reacting at a temperature of at least 100° C. upon a cellulose acetate containing free and esterifiable hydroxyl groups, with a dicarboxylic acid anhydride in a bath comprising sufficient inert solvent having a boiling point below 100° C. to dissolve the reagents, the bath being free from esterification catalysts and tertiary organic bases.

5. The process of preparing a cellulose ester containing dicarboxylic acid radicals which comprises reacting, under enclosed conditions at a temperature of at least 100° C., upon a cellulose derivative containing free and esterifiable hydroxyl groups, with a dicarboxylic acid anhydride in a bath comprising sufficient inert solvent having a boiling point below 100° C. to dissolve the reagents, the bath being free from esterification catalysts and tertiary organic bases.

6. The process of preparing a cellulose ester containing dicarboxylic acid radicals which comprises reacting at a temperature of at least 100° C. upon a cellulose derivative containing free and esterifiable hydroxyl groups, with a dicarboxylic acid anhydride in the presence of sufficient ketone having a boiling point below 100° C. to dissolve the reagents, the bath being free from esterification catalysts and tertiary organic bases.

7. The process of preparing a cellulose ester containing dicarboxylic acid radicals which comprises reacting, under enclosed conditions at a temperature of at least 100° C., upon a cellulose acetate containing free and esterifiable hydroxyl groups, with a dicarboxylic acid anhydride in a bath comprising a low boiling ketone, the bath being free from esterification catalysts and tertiary organic bases.

8. The process of preparing a cellulose ester containing phthalic acid radicals which comprises reacting, under enclosed conditions at a temperature of at least 100° C., upon a cellulose acetate containing free and esterifiable hydroxyl groups, with a phthalic acid anhydride in a bath comprising sufficient low-boiling ketone to dissolve the reagents, the bath being free from esterification catalysts and tertiary organic bases.

9. The process of preparing a cellulose ester containing dicarboxylic acid radicals which comprises reacting at a temperature of at least 100° C. upon a fatty acid ester of cellulose containing free and esterifiable hydroxyl groups, with a dicarboxylic acid anhydride in a bath comprising sufficient 1.4 dioxan to dissolve the reagents, the bath being free from esterification catalysts and organic bases.

LEO B. GENUNG.